US009910627B2

United States Patent
Ishizu et al.

(10) Patent No.: US 9,910,627 B2
(45) Date of Patent: Mar. 6, 2018

(54) REMOTE MAINTENANCE SYSTEM AND REMOTE MAINTENANCE METHOD

(71) Applicant: KYOCERA DOCUMENT SOLUTIONS INC., Osaka (JP)

(72) Inventors: Ryuichi Ishizu, Osaka (JP); Toyoaki Oku, Osaka (JP); Takeshi Nakamura, Osaka (JP); Ryosuke Mondo, Osaka (JP); Atsushi Matsumoto, Osaka (JP); Katsuhiro Minoru, Osaka (JP); Daisuke Yoshida, Osaka (JP)

(73) Assignee: KYOCERA DOCUMENT SOLUTIONS INC., Osaka (JP)

( * ) Notice: Subject to any disclaimer, the term of this patent is extended or adjusted under 35 U.S.C. 154(b) by 0 days.

(21) Appl. No.: 15/203,587

(22) Filed: Jul. 6, 2016

(65) Prior Publication Data

US 2017/0017445 A1  Jan. 19, 2017

(30) Foreign Application Priority Data

Jul. 13, 2015  (JP) .................................. 2015-139472

(51) Int. Cl.
*G06F 3/12* (2006.01)
*H04N 1/00* (2006.01)
*G06F 11/07* (2006.01)

(52) U.S. Cl.
CPC .......... *G06F 3/1229* (2013.01); *G06F 3/1204* (2013.01); *G06F 3/1285* (2013.01);
(Continued)

(58) Field of Classification Search
CPC .... G06F 3/1229; G06F 3/1204; G06F 3/1285; G06F 11/0733; H04N 1/00244; H04N 1/00408; H04N 2201/0094
See application file for complete search history.

(56) References Cited

U.S. PATENT DOCUMENTS

| 8,363,236 B2 * | 1/2013 | Onsen | G06F 13/102 358/1.13 |
| 2007/0133030 A1 * | 6/2007 | Kanamoto | H04N 1/00954 358/1.13 |
| 2009/0296135 A1 * | 12/2009 | Miyajima | H04N 1/00962 358/1.15 |

FOREIGN PATENT DOCUMENTS

| JP | 2007-150874 A | 6/2007 |
| JP | 2011-096049 A | 5/2011 |

* cited by examiner

*Primary Examiner* — Iriana Cruz
(74) *Attorney, Agent, or Firm* — Li&Cai Intellectual Property (USA) Office

(57) ABSTRACT

A remote maintenance system includes: a remote maintenance server; and one or more image forming apparatuses, the server including an operation input unit, a display unit, a storage unit that stores panel programs, a communication unit, an image forming apparatus database in which functions are registered, and a manager circuit that acquires, when a serviceman instructs restoration, the panel program to be restored from the storage unit, analyzes which of the functions is to be invoked by the panel program, compares, by referencing the database, the function of the restore-destination apparatus and the function to be invoked, and determines whether the restore-destination apparatus executes the panel program, and instructs the restore-destination apparatus to restore the panel program when it executes the panel program, each image forming apparatus restoring, when receiving a restore instruction, the panel program based on the instruction.

5 Claims, 3 Drawing Sheets

(52) U.S. Cl.
CPC ...... *G06F 11/0733* (2013.01); *G06F 11/0748* (2013.01); *G06F 11/0793* (2013.01); *H04N 1/00244* (2013.01); *H04N 1/00408* (2013.01); *H04N 2201/0094* (2013.01)

REMOTE MAINTENANCE SYSTEM AND REMOTE MAINTENANCE METHOD

INCORPORATION BY REFERENCE

This application claims the benefit of Japanese Priority Patent Application JP 2015-139472 filed Jul. 13, 2015, the entire contents of which are incorporated herein by reference.

FIELD

The present disclosure relates to a remote maintenance system and a remote maintenance method, that are used for remotely maintaining an image forming apparatus (MFP; Multifunction Peripheral).

BACKGROUND

At present, to enable users to simply use image forming apparatuses having multiple functions, there is a function called panel program that involves pre-registering various settings requisite for using those functions in the image forming apparatuses.

It is desirable to provide a remote maintenance system and a remote maintenance method with which a registered panel program can be transferred appropriately at a time an image forming apparatus is replaced.

SUMMARY

According to an embodiment of the present disclosure, there is provided a remote maintenance system including: a remote maintenance server; and one or more image forming apparatuses, the remote maintenance server including an operation input unit that receives instructions from a serviceman who is remotely maintaining the one or more image forming apparatuses, a display unit that displays various types of information to the serviceman, a storage unit that stores panel programs, a communication unit that communicates with the one or more image forming apparatuses, an image forming apparatus database in which functions, that each of the one or more image forming apparatuses has and are invoked from the panel programs, are registered for each of the image forming apparatuses, and a manager circuit that acquires, when the serviceman instructs restoration of one of the panel programs stored in the storage unit in a specific image forming apparatus, the panel program to be restored from the storage unit, analyzes what functions are to be invoked by the acquired panel program, compares, by referencing the image forming apparatus database, the functions of the restore-destination image forming apparatus and the functions to be invoked by the analyzed panel program, and determines whether the restore-destination image forming apparatus executes the analyzed panel program, and instructs the restore-destination image forming apparatus to restore the analyzed panel program in the restore-destination image forming apparatus when the restore-destination image forming apparatus executes the analyzed panel program, each of the image forming apparatuses restoring, when receiving a panel program restore instruction in the apparatus itself from the manager circuit, the panel program in the apparatus itself based on the received instruction.

In the remote maintenance system according to the embodiment of the present disclosure, when the restore-destination image forming apparatus does not execute the analyzed panel program, the manager circuit may search for other image forming apparatuses that alternatively execute the analyzed panel program using the image forming apparatus database, present candidates of the other image forming apparatuses that alternatively execute the analyzed panel program to the serviceman based on the search result, and instruct the selected image forming apparatus to restore the analyzed panel program based on the selection from the candidates by the serviceman.

According to an embodiment of the present disclosure, there is provided a remote maintenance method by a remote maintenance server for one or more image forming apparatuses, the method including: via the remote maintenance server, receiving an instruction from a serviceman who is remotely maintaining the one or more image forming apparatuses; presenting various types of information to the serviceman; storing panel programs; communicating with the one or more image forming apparatuses; registering functions, that each of the one or more image forming apparatuses has and are invoked from the panel programs, in an image forming apparatus database for each of the image forming apparatuses; acquiring, when instructed by the serviceman of restoration of one of the stored panel programs in a specific image forming apparatus, the panel program to be restored; analyzing what functions are to be invoked by the acquired panel program; comparing, by referencing the image forming apparatus database, the functions of the restore-destination image forming apparatus and the functions to be invoked by the analyzed panel program, and determining whether the restore-destination image forming apparatus executes the analyzed panel program; and instructing the restore-destination image forming apparatus to restore the analyzed panel program in the restore-destination image forming apparatus when the restore-destination image forming apparatus executes the analyzed panel program, and via each of the one or more image forming apparatuses, restoring, when receiving a panel program restore instruction in the apparatus itself from the remote maintenance server, the panel program in the apparatus itself based on the received instruction.

These and other objects, features and advantages of the present disclosure will become more apparent in light of the following detailed description of best mode embodiments thereof, as illustrated in the accompanying drawings.

DETAILED DESCRIPTION

Hereinafter, an embodiment of the present disclosure will be described with reference to the drawings.

(General Outline and Overall Structure of Remote Maintenance System)

Figure 1:
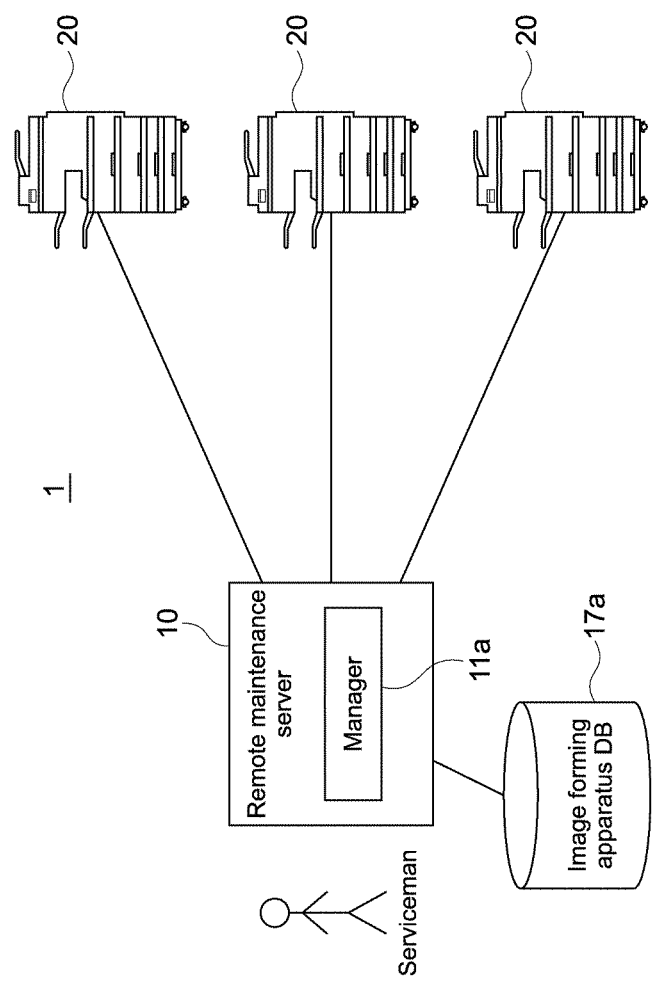
FIG. 1 is a schematic diagram illustrating a configuration of a remote maintenance system 1 according to an embodiment of the present disclosure.

First, a general outline and overall structure of a remote maintenance system according to the embodiment of the present disclosure will be described. FIG. 1 is a schematic diagram illustrating a configuration of a remote maintenance system 1 according to the embodiment of the present disclosure.

The remote maintenance system 1 includes a remote maintenance server 10 and one or more image forming apparatuses 20.

The remote maintenance server 10 backs up panel programs of the image forming apparatuses 20 or restores a panel program backed up with respect to an updated (replaced) image forming apparatus 20.

It should be noted that the panel programs each have a mechanism of automatically executing a combination of a plurality of functions of the image forming apparatus 20 at a time of printing and the like. In each of the panel programs, a plurality of functions selected in the image forming apparatus are stored so that the stored functions can be invoked and set by one designation instruction made by a user.

For realizing the functions described above, the remote maintenance server 10 includes an image forming apparatus DB (database) 17a (to be described later) that stores various types of information of the image forming apparatuses 20.

In backing up panel programs from the image forming apparatuses 20 or restoring panel programs in the image forming apparatuses 20, information is exchanged between a target image forming apparatus 20 and a manager 11a of the remote maintenance server 10 via a network.

The overall structure of the remote maintenance system 1 has been described heretofore.

(Structure of Remote Maintenance Server)

Next, the structure of the remote maintenance server 10 will be described. The remote maintenance server 10 may be constituted of dedicated hardware or software, or may be constituted of a typical computer. A block configuration of the remote maintenance server is illustrated in FIG. 2.

Figure 2:
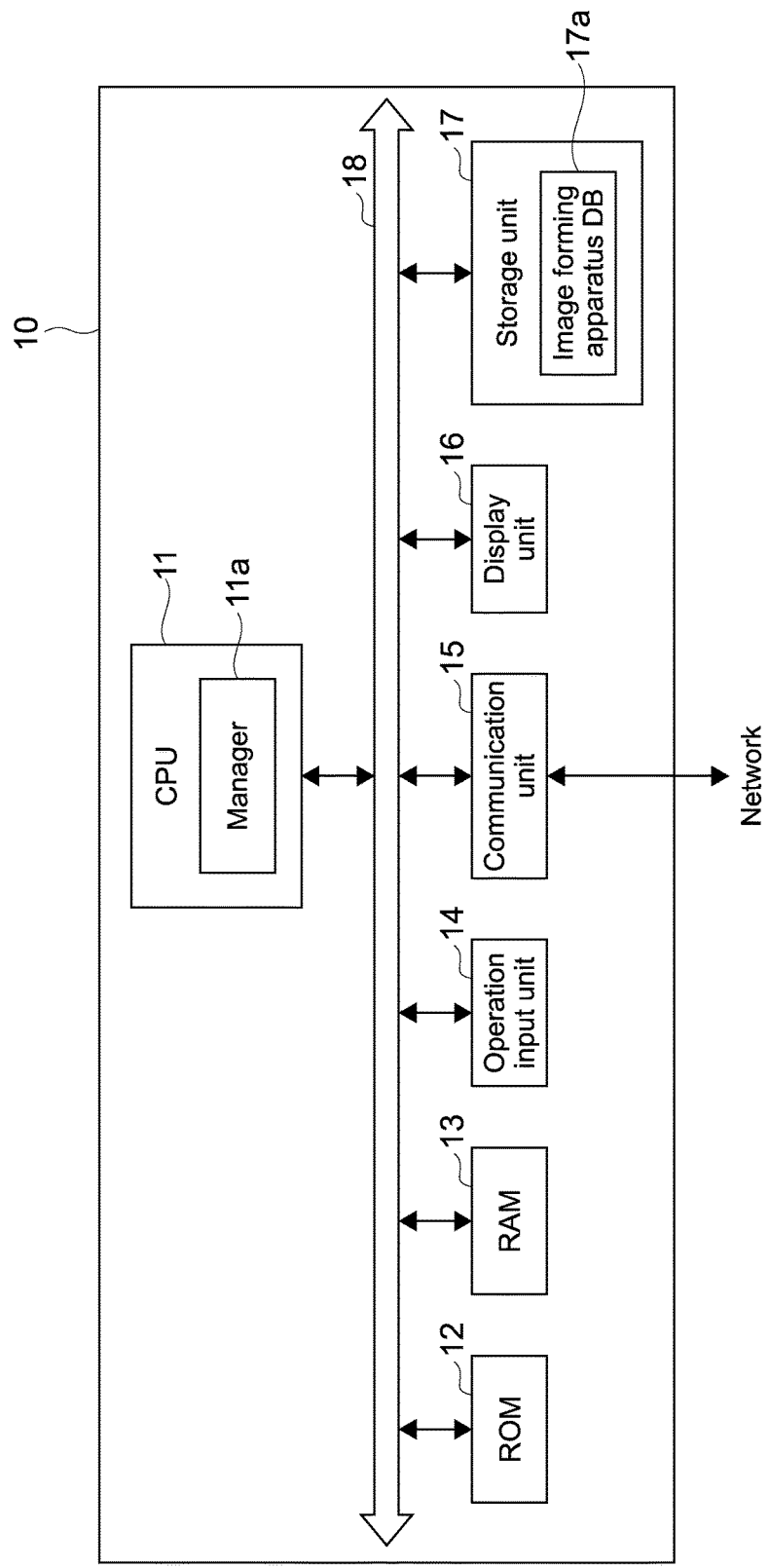
FIG. 2 is a schematic diagram illustrating a block configuration of a remote maintenance server 10.

As shown in FIG. 2, the remote maintenance server 10 includes a CPU (Central Processing Unit) 11, a ROM (Read Only Memory) 12, a RAM (Random Access Memory) 13, an operation input unit 14, a communication unit 15, a display unit 16, and a storage unit 17, that are mutually connected via a bus 18.

The ROM 12 stores a plurality of data items and programs such as firmware for executing various types of processing. The RAM 13 is used as a working area of the CPU 11 and temporarily stores various applications being executed and various types of data being processed.

The storage unit 17 is, for example, an HDD (Hard Disk Drive), a flash memory, or other nonvolatile memories. The storage unit 17 stores an OS, various applications, various types of data, and the image forming apparatus DB 17a.

The communication unit 15 is connected to the network for exchanging information with the image forming apparatuses 20.

Of the plurality of programs stored in the ROM 12 or the storage unit 17, the CPU 11 develops a program corresponding to a command input via the operation input unit 14 in the RAM 13 and appropriately controls the display unit 16 and the storage unit 17 according to the developed program.

The operation input unit 14 is, for example, a pointing device such as a mouse, a keyboard, a touch panel, or other operation devices.

The display unit 16 is, for example, a liquid crystal display, an EL (Electro-Luminescence) display, or a plasma display.

Next, functional blocks will be described. The functional blocks are realized by the CPU 11 loading and executing programs recorded in the ROM 12 as a non-transitory computer readable recording medium, in the RAM 13.

The functional blocks realized by the CPU 11 of the remote maintenance server 10 correspond to the manager 11a (manager circuit).

As well as backing up a panel program of a designated image forming apparatus 20 based on an instruction from a serviceman, when that image forming apparatus 20 is replaced, the manager 11a references the image forming apparatus DB 17a to determine which of the image forming apparatuses 20 the panel program is to be restored in and executes restoration.

It should be noted that details of the processing of the manager 11a will be described later.

The structure of the remote maintenance server 10 has been described heretofore.

(Processing Flow)

Figure 3:
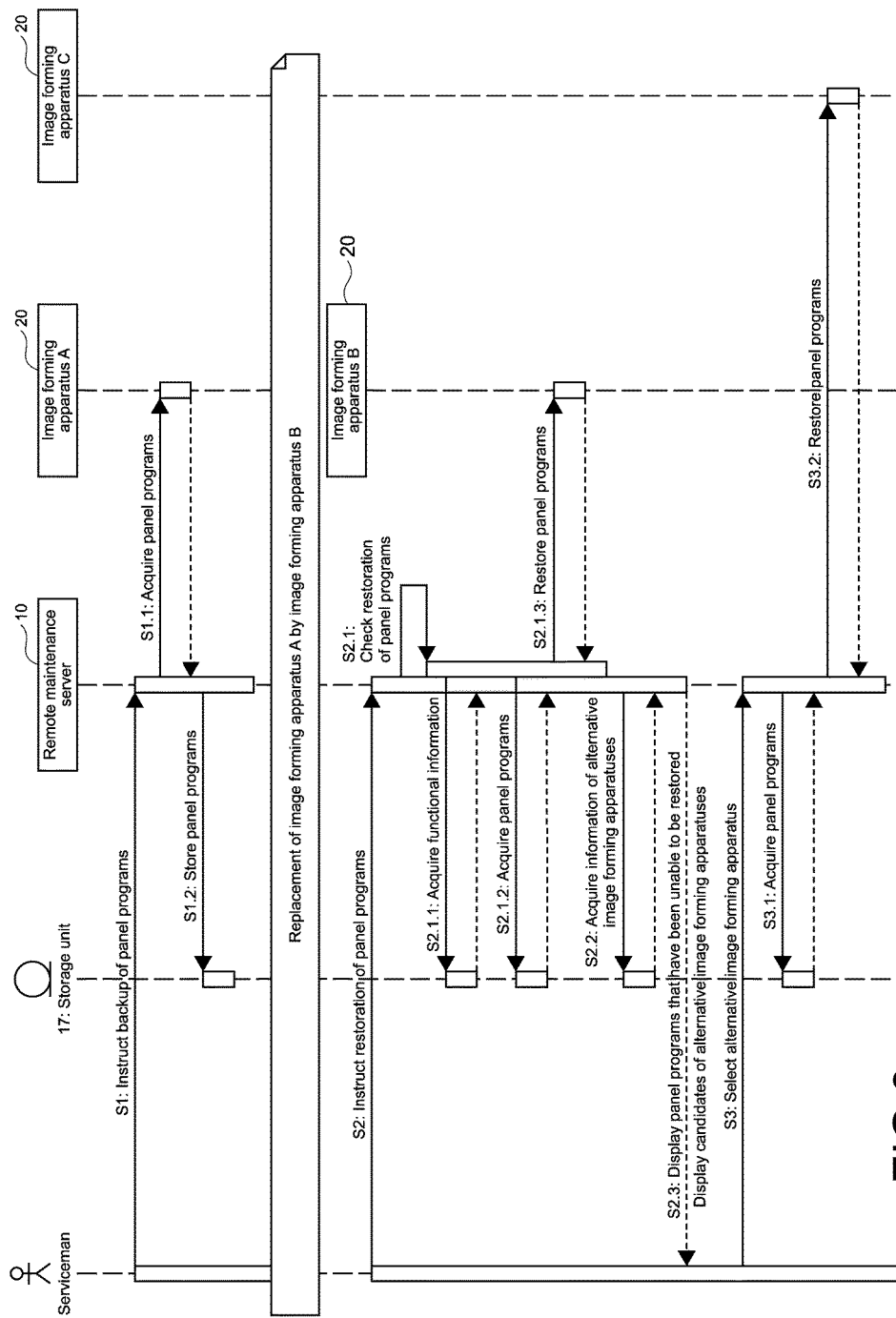
FIG. 3 is a flowchart of a processing flow in the remote maintenance system 1.

Next, a processing flow of the remote maintenance system 1 will be described. FIG. 3 is a flowchart of the processing flow of the remote maintenance system 1.

It should be noted that in the descriptions below, the image forming apparatus 20 to be replaced will be referred to as image forming apparatus A, the image forming apparatus 20 by which the image forming apparatus A is to be replaced will be referred to as image forming apparatus B, and the alternative image forming apparatus 20 that is capable of executing a panel program that can be executed by the image forming apparatus A but cannot be executed by the image forming apparatus B will be referred to as image forming apparatus C.

First, a serviceman outputs a panel program backup instruction to the remote maintenance server 10 for backing up panel programs from the image forming apparatus A to be replaced (Step S1).

Next, the manager 11a of the remote maintenance server 10 that has received the backup instruction transmits a panel program acquisition request for the backup to the image forming apparatus A (Step S1.1). Then, panel programs are transmitted from the image forming apparatus A.

Subsequently, the manager 11a stores the panel programs transmitted from the image forming apparatus A in the storage unit 17 (Step S1.2).

Upon completing the processing described above, the image forming apparatus A is replaced by the image forming apparatus B at the site.

Upon completing the replacement by the image forming apparatus B, the serviceman instructs the remote maintenance server 10 to restore the panel programs backed up from the image forming apparatus A, in the image forming apparatus B (Step S2).

Next, the manager 11a that has received the panel program restore instruction checks whether the panel programs backed up from the image forming apparatus A can be restored in the image forming apparatus B (Step S2.1).

The check at this time is made by comparing the functions of the image forming apparatuses to be invoked by the panel programs.

For example, the check is made by analyzing the panel programs backed up from the image forming apparatus A, checking what functions of the image forming apparatus A have been invoked by the panel programs, and searching the functions of the image forming apparatus B registered in the image forming apparatus DB 17a to check whether the image forming apparatus B has the same functions.

As a part of the checking task, the manager 11a acquires information on the functions (functional information) of the image forming apparatus B from the image forming apparatus DB 17a (Step S2.1.1).

Also as a part of the checking task, the manager 11a acquires the panel programs backed up from the image forming apparatus A from the storage unit 17 (Step S2.1.2).

Next, the manager 11a restores the panel programs determined as executable in the image forming apparatus B as a result of the check, in the image forming apparatus B (Step S2.1.3).

Then, when there is a panel program determined as unexecutable by the image forming apparatus B out of the panel programs backed up from the image forming apparatus A, the manager 11a searches for an alternative image forming apparatus that is capable of executing that panel program.

In the descriptions below, some of the panel programs backed up from the image forming apparatus A cannot be executed by the image forming apparatus B but can be executed by the image forming apparatus C.

The panel programs determined as unexecutable by the image forming apparatus B each have a search function to be invoked, and each panel program searches the image forming apparatus DB 17a for an image forming apparatus capable of alternatively executing the panel program.

It should be noted that regarding the range for searching for the image forming apparatus capable of alternatively executing the panel programs, it is favorable to select the image forming apparatus from the image forming apparatuses installed at the same location as the image forming apparatuses involved in the replacement (image forming apparatuses A and B).

It should be noted that the same location used herein may mean the same client, an office in one city in a case where one client has offices in a plurality of cities, or one floor in a case where a client uses a plurality of floors.

As a part of the processing of searching for an alternative image forming apparatus, the manager 11a acquires information on the functions included in the alternative-candidate image forming apparatuses from the image forming apparatus DB 17a (Step S2.2).

Next, the manager 11a presents to the serviceman a list of panel programs that have been unable to be restored in the image forming apparatus B out of the panel programs backed up from the image forming apparatus A, and presents to the serviceman a list of candidate image forming apparatuses that are capable of alternatively executing the panel programs that have been unable to be restored (Step S2.3).

The serviceman selects the image forming apparatus to alternatively execute the panel programs from the presented candidate list of alternative image forming apparatuses (Step S3).

Next, of the panel programs that have been backed up from the image forming apparatus A and have been unable to be restored in the image forming apparatus B, the manager 11a acquires a panel program that can be alternatively executed by the image forming apparatus C from the storage unit 17 (Step S3.1).

Next, the manager 11a restores the panel program acquired in the preceding step in the selected image forming apparatus (image forming apparatus C herein) (Step S3.2).

The processing flow of the remote maintenance system 1 has been described heretofore.

As described above, in the embodiment of the present disclosure, the manager 11a analyzes the functions of the image forming apparatus, that are to be invoked by the panel programs, and compares them with the functions of the other image forming apparatuses. As a result, when the image forming apparatus is replaced, the panel programs can be restored appropriately without resetting the panel programs.

Moreover, in restoring panel programs, when there is a panel program that cannot be executed by the replaced image forming apparatus, the manager 11a presents, to the serviceman, other image forming apparatuses capable of alternatively executing that panel program so as to restore the panel program in the image forming apparatus selected by the serviceman. Therefore, the panel program that cannot be executed by the replaced image forming apparatus can be restored appropriately in another image forming apparatus to be used without resetting the panel program.

(Supplementary Note)

At present, to enable users to simply use image forming apparatuses having multiple functions, there is a function called panel program that involves pre-registering various settings requisite for using those functions in the image forming apparatuses.

For example, there is known a typical technique with which a user can easily register a combination of desired functions that are highly-frequently used in a normal setting task.

For example, there is also known a typical technique of easily executing multiple functions and parameter settings using fingerprints.

At a location where a user uses an image forming apparatus (office etc.), there may be a case where, even when an image forming apparatus capable of printing on A3-size papers is installed, most of the printing is printing on A4-size papers and printing on A3-size papers is hardly performed.

Typically in such a case, the image forming apparatus capable of printing on A3-size papers, which is charged of a high lease fee, is replaced by an image forming apparatus capable of printing only on A4-size papers, which is charged of a low lease fee, for example. As described above, the image forming apparatuses are replaced depending on user usage situations.

While ingenuities are made in terms of usage of panel programs in the typical techniques described above, the problems that arise in a case where an image forming apparatus used by a user is replaced by another image forming apparatus have not been solved. The problems arise when panel programs registered in the old apparatus are used in the new apparatus.

In contrast, as described above, according to the embodiment of the present disclosure, there is provided a remote maintenance system 1, including: a remote maintenance server 10; and one or more image forming apparatuses 20, the remote maintenance server 10 including an operation input unit 14 that receives instructions from a serviceman who is remotely maintaining the one or more image forming apparatuses 20, a display unit 16 that displays various types of information to the serviceman, a storage unit 17 capable of storing panel programs, a communication unit 15 capable of communicating with the one or more image forming apparatuses 20, an image forming apparatus database 17a in which functions, that are included in each of the one or more image forming apparatuses 20 and can be invoked from the panel programs, are registered for each of the image forming apparatuses 20, and a manager 11a that acquires, when the serviceman instructs restoration of one of the panel programs stored in the storage unit 17 with respect to a specific image forming apparatus 20, the panel program to be restored from the storage unit 17, analyzes what functions are to be invoked by the acquired panel program, compares, by referencing the image forming apparatus database 17a, the functions included in the restore-destination image forming apparatus 20 and the functions to be invoked by the analyzed panel program, and determines whether the restore-destination image forming apparatus 20 is capable of executing the analyzed panel program, and instructs the restore-destination image forming apparatus 20 to restore the analyzed panel program in the restore-destination image forming apparatus 20 when the restore-destination image forming apparatus 20 is capable of executing the analyzed panel program, each of the image forming apparatuses 20 restoring, upon receiving a panel program restore instruction with respect to the apparatus 20 itself from the manager 11a, the panel program in the apparatus 20 itself based on the received instruction.

Therefore, the registered panel programs can be appropriately transferred at the time the image forming apparatus is replaced.

In addition, the present disclosure is not limited to the embodiment described above and can be variously modified without departing from the gist of the present disclosure.

What is claimed is:

1. A remote maintenance system, comprising:
a remote maintenance server; and
one or more image forming apparatuses connectable to the remote maintenance server via a network,
the remote maintenance server including:
an operation device including a pointing device, a keyboard, and a touch panel that receives instructions for remotely maintaining the one or more image forming apparatuses;
a display device including a liquid crystal display, an Electro-Luminescence (EL) display, and a plasma display that displays various types of information to the serviceman;
a nonvolatile memory including a Hard Disk Drive (HDD) and a flash memory that stores panel programs and an image forming apparatus database;
a Central Processing Unit (CPU);
a Read Only Memory (ROM); and
a Random Access Memory (RAM),
wherein each of the panel programs has a mechanism of automatically executing a combination of a plurality of functions of each of the one or more image forming apparatuses, and the plurality of functions are called and set by one specified instruction,
wherein the image forming apparatus database includes the plurality of functions which each of the one or more image forming apparatuses has and are called from the panel programs, and is registered for each of the one or more image forming apparatuses, and
wherein the CPU loads in the RAM a program stored in at least one of the nonvolatile memory and the ROM, and executes the program to function as a manager circuit, and
the manager circuit is configured for:
acquiring, when being input an instruction for restoring the panel programs stored in the nonvolatile memory in a first image forming apparatus, the panel programs to be restored from the nonvolatile memory;
acquiring information on the plurality of functions of a second image forming apparatus from the image forming apparatus database;
analyzing what the plurality of functions are called by the acquired panel programs in the first image forming apparatus;
making a check by comparing the plurality of functions of the second image forming apparatus and the plurality of functions called by the panel programs to be restored;
determining whether the second image forming apparatus has the plurality of functions same as the plurality of functions called by the panel programs in the first image forming apparatus; and
instructing the second image forming apparatus to restore the panel programs determined to be executable in the second image forming apparatus by the check, in the second image forming apparatus, and
wherein the second image forming apparatus restores the panel programs determined to be executable based on instructing from the manager circuit.

2. The remote maintenance system according to claim 1, wherein, when determining there are the panel programs which the second image forming apparatus does not execute, the manager circuit is further configured for:
searching for other image forming apparatuses that alternatively execute the panel programs by acquiring the information on the plurality of the functions of the other image forming apparatuses from the image forming apparatus database;
presenting a list of the other image forming apparatuses that alternatively execute the panel programs which the second image forming apparatus does not execute; and
instructing a third image forming apparatus selected from the list of the other image forming apparatuses to restore the panel programs to be alternatively executable, and
wherein the third image forming apparatus restores the panel programs determined to be alternatively executable based on instructing from the manager circuit.

3. The remote maintenance system according to claim 2, wherein
the manager circuit selects the third image forming apparatus among the other image forming apparatuses installed at a location same as the location of the first image forming apparatus and the second image forming apparatus, and
the location means the same client, an office in one city in a case where one client has offices in a plurality of cities, and one floor in a case where a client is using a plurality of floors.

4. A remote maintenance method by a remote maintenance server for one or more image forming apparatuses connectable to the maintenance server via a network, the remote maintenance server including a nonvolatile memory including a Hard Disk Drive (HDD) and a flash memory that stores panel programs and an image forming apparatus database,
wherein each of the panel programs has a mechanism of automatically executing a combination of a plurality of functions of each of the one or more image forming apparatuses, and the plurality of functions are called and set by one specified instruction, and
wherein the image forming apparatus database includes the plurality of functions which each of the one or more image forming apparatuses has and are called from the panel programs, and is registered for each of the one or more image forming apparatuses,
the method comprising:
via the remote maintenance server,
acquiring, when being input an instruction for restoring the panel programs stored in the nonvolatile memory in a first image forming apparatus, the panel programs to be restored from the nonvolatile memory;
acquiring information on the plurality of functions of a second image forming apparatus from the image forming apparatus database;

analyzing what the plurality of functions are called by the acquired panel programs in the first image forming apparatus;

making a check by comparing the plurality of functions of the second image forming apparatus and the plurality of functions called by the panel programs to be restored;

determining whether the second image forming apparatus has the plurality of functions same as the plurality of functions called by the panel programs in the first image forming apparatus; and instructing the second image forming apparatus to restore the panel programs determined to be executable in the second image forming apparatus by the check, in the second image forming apparatus, and wherein the second image forming apparatus restores the panel programs determined to be executable based on instructing from the manager circuit.

5. The remote maintenance method according to claim 4, further comprising:

when determining there are the panel programs which the second image forming apparatus does not execute, searching for other image forming apparatuses that alternatively execute the panel programs by acquiring the information on the plurality of the functions of the other image forming apparatuses from the image forming apparatus database;

presenting a list of the other image forming apparatuses that alternatively execute the panel programs which the second image forming apparatus does not execute; and instructing a third image forming apparatus selected from the list of the other image forming apparatuses to restore the panel programs to be alternatively executable, wherein the third image forming apparatus restores the panel programs determined to be alternatively executable based on instructing from the manager circuit.

\* \* \* \* \*